(12) United States Patent
Mollenkopf et al.

(10) Patent No.: US 6,845,083 B2
(45) Date of Patent: Jan. 18, 2005

(54) MULTI-STANDARD TRANSMITTER SYSTEM AND METHOD FOR A WIRELESS COMMUNICATION SYSTEM

(75) Inventors: Steven M. Mollenkopf, San Diego, CA (US); Puay Hoe Andrew See, San Deigo, CA (US); Brett C. Walker, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 130 days.

(21) Appl. No.: 10/357,739

(22) Filed: Feb. 3, 2003

(65) Prior Publication Data

US 2003/0227896 A1 Dec. 11, 2003

Related U.S. Application Data

(60) Provisional application No. 60/355,433, filed on Feb. 5, 2002.

(51) Int. Cl.[7] .............................................. H04L 15/00
(52) U.S. Cl. ...................... 370/215; 370/252; 455/112; 455/114.2; 455/216
(58) Field of Search ................................. 370/204, 206, 370/211, 215, 241, 252, 342, 69.1, 122; 455/110, 112, 114, 139, 205, 216; 708/103, 835, 844; 324/76.15, 76.24; 331/2, 22, 25, 31

(56) References Cited

U.S. PATENT DOCUMENTS

| 4,458,329 A | * | 7/1984 | Remy ........................ 708/103 |
| 4,542,657 A | * | 9/1985 | Barber et al. ............ 324/76.15 |
| 4,673,891 A | * | 6/1987 | Remy ........................... 331/2 |
| 6,025,758 A | | 2/2000 | Lu .............................. 332/100 |
| 6,101,225 A | | 8/2000 | Thorson ...................... 375/308 |
| 6,201,175 B1 | * | 3/2001 | Kikumoto et al. .......... 708/203 |

FOREIGN PATENT DOCUMENTS

JP  357057060 A * 4/1982 ........... H04L/27/22

OTHER PUBLICATIONS

W. Pratt: Technical Article: "ICs Simplify the Design of Digital Communications Links", RF Micro Devices, Inc.; Aug. 1994, pp. 1–4.

* cited by examiner

*Primary Examiner*—Duc Ho
*Assistant Examiner*—Phuongchau Ba Nguyen
(74) *Attorney, Agent, or Firm*—Philip Wadsworth; Charles Brown; Richard Bachand

(57) ABSTRACT

A transmitter 108 converts a digital baseband signal input 150 for transmission by an antenna 114 to support multiple communication standards. An over-deviation phase multiplier 130 increases signal phase deviation by a factor of M. A digital phase modulator 176 applies trigonometric lookup tables. A digital intermediate frequency up-converter 132 up-shifts frequencies of desired signal content. First and second digital-to-analog converters (DACs) 134 and 136 use relatively low-bit operations, which add DAC noise 212. First and second low pass filters 138 and 140 apply rejection above frequencies of desired signal content. An analog I/Q modulator 142 converts from complex to real signals, adding an unwanted signal spaced from the desired signal content by an intermediate frequency multiple. A limiter 144 reduces amplitude modulated noise. An over-deviation phase divider 146 divides signal phase deviation by 1/M to reduce phase modulated noise.

36 Claims, 9 Drawing Sheets

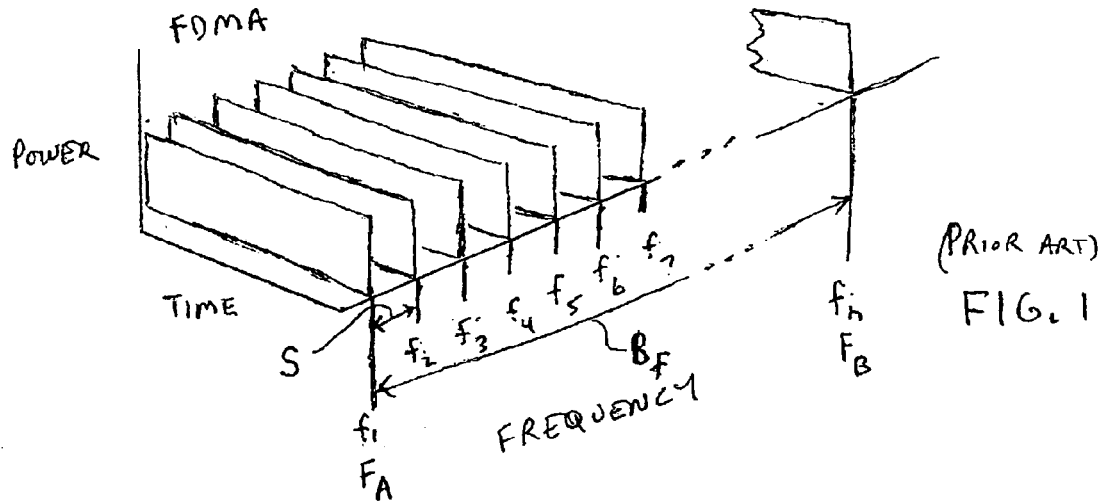
(PRIOR ART) FIG. 1
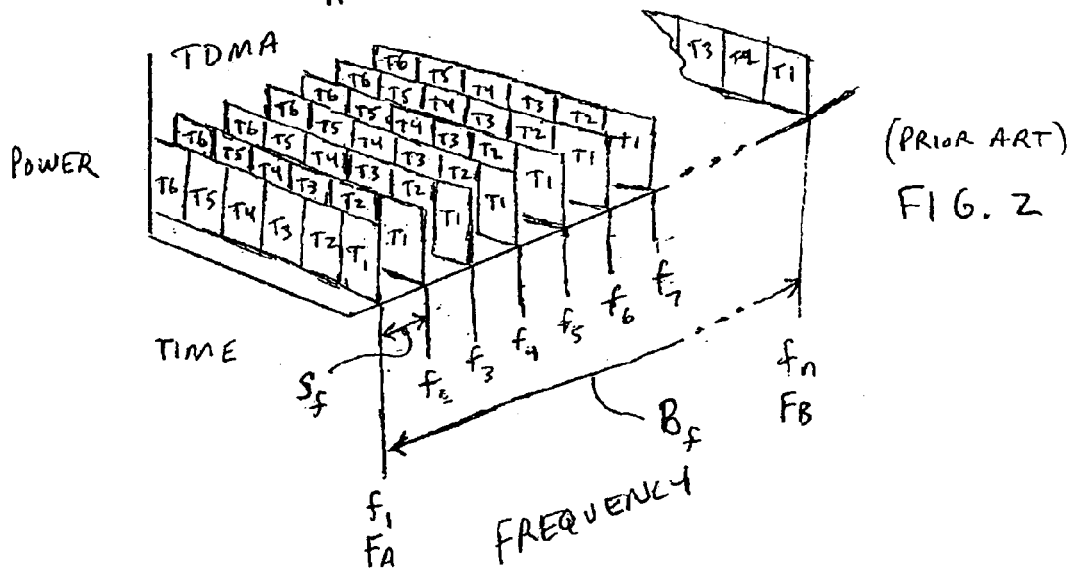
(PRIOR ART) FIG. 2
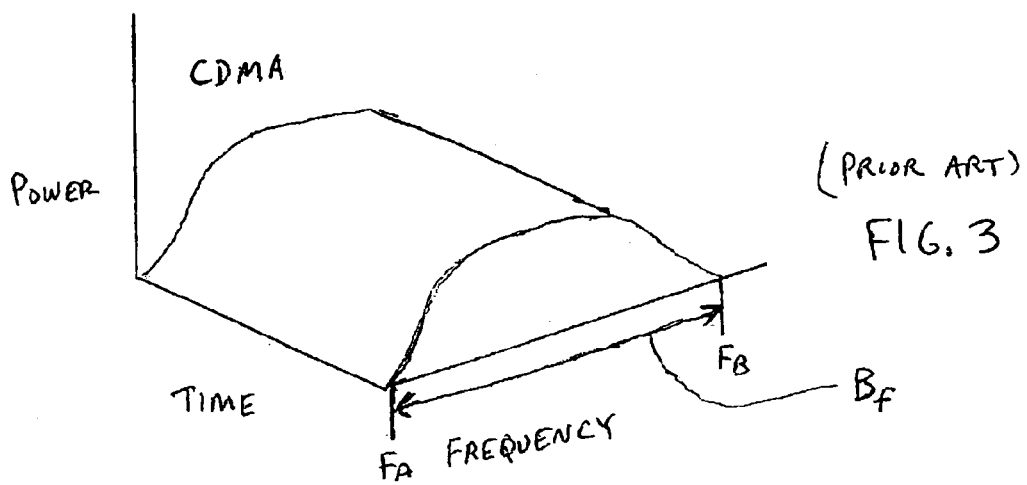
(PRIOR ART) FIG. 3

MULTI-STANDARD TRANSMITTER SYSTEM AND METHOD FOR A WIRELESS COMMUNICATION SYSTEM

RELATED APPLICATIONS

This application claims priority to U.S. Provisional Application Ser. No. 60/355,433, filed on Feb. 5, 2002.

BACKGROUND OF THE INVENTION

1. Technical Field

The present invention relates generally to wireless communication systems and, more particularly, to a multi-standard transmitter system and method for noise reduction through phase modulation.

2. Description of Related Art

Wireless communication devices, such as cellular telephones, are widely used as a replacement for conventional telephone systems. One advantage of the wireless communication devices is their portability. The user can operate the wireless communication devices from virtually any point on earth. Since component size, weight, and power requirements of the wireless communication device can detrimentally affect portability, they are important factors that directly impact its utility.

For communication to occur, signals are transmitted from and received by components of the wireless communication devices. Transmitters, either separate or part of a transceiver, handle transmission tasks for the wireless communication device. Transmitters typically accept complex digital baseband signals to be transmitted. These complex digital baseband signals are internally generated within the wireless communication device. The transmitters subsequently perform forms of modulation, frequency up-conversion, digital-to-analog conversion and power amplification of the baseband signals.

Digital-to-analog conversion is an important aspect for transmitters since it has the potential of producing a great deal of signal noise. Conventional approaches to digital-to-analog conversion include using particular kinds of digital-to-analog converters (DACS) with a relatively high number of operational bits to perform the digital-to-analog conversion. For instance, some transmitters use 10-bit or 12-bit DACs. Other conventional approaches use DACs with fewer number of operational bits to reduce costs, but are forced to alleviate the additional noise caused by the lower bit DACs by using elaborate filtering.

The trade-off analysis between the amount of noise generated by low-bit DACs versus the expense associated with high-bit DACs become even more complex for transmitters configured for a multi-standard communication device such as a multi-standard cellular telephone. In particular, aspects of cellular telephones standards related to multiplexing of simultaneous telephone calls impact greatly the implementation of DACs in a multi-standard environment. In general, multiplexing is performed with cellular telephone systems either with a frequency division multiple access (FDMA) method, a time division multiple access (TDMA) method or a code division multiple access (CDMA) method.

With the FDMA methods, individual simultaneous cellular telephone calls are assigned different frequencies within a given frequency band. As shown in FIG. 1, a frequency band will have a bandwidth, $B_f$ with individual carrier frequencies, $F_1$ through $F_n$. With the FDMA method, a pair of individual carrier frequencies supports one simultaneous cellular telephone call in which one carrier frequency of the pair handles communication from mobile stations to base stations and the other carrier frequency of the pair handles communication from base stations to mobile stations.

TDMA methods also use transmission frequency bands having individual carrier frequencies, however, the individual TDMA carrier frequencies are further divided by time based multiplexing so that a pair of TDMA carrier frequencies can support multiple simultaneous telephone calls. For instance, as shown in FIG. 2, a pair of TDMA carrier frequencies can support a multitude of simultaneous telephone calls since each carrier frequency is divided into numerous time segments wherein one carrier frequency of the pair is used for uplink communication and the other carrier frequency of the pair is used for downlink communication.

CDMA methods differ from the FDMA and TDMA methods in that the CDMA methods use transmission frequency bands in which no individual carrier frequencies are designated for particular telephone calls. Instead, and individual telephone call can be distributed throughout a particular frequency band between frequencies $F_A$ and $F_B$ as shown in FIG. 3.

Global System for Mobile Communications (GSM) is a cellular telephone communication standard that uses a particular form of TDMA multiplexing in which the individual carrier frequencies of a frequency band are spaced in 200 kHz intervals as shown in FIG. 4. Under the GSM standard, as shown in FIG. 5, for each carrier signal having a particular carrier frequency, $f_{signal}$, a first amount of power is measured in a 30 kHz bandwidth area centered on the carrier frequency, $f_{signal}$, and a second amount of power is measured in a 30 kHz bandwidth area centered on a test frequency $f_{test}$, that is 400 kHz away from the carrier frequency, $f_{signal}$. According to the GSM standard, the second amount of power should be at least 60 decibels below the first amount of power.

Standards that use CDMA technology are less demanding regarding noise requirements compared with the GSM standard. Second generation CDMA technology uses carriers having wide transmission frequency bands, such as the 1.23 MHz frequency band, shown in FIG. 6. Third generation CDMA technology uses Wide CDMA (WCDMA), which uses carriers having transmission frequency bands of five MHz to 15 MHz such as shown in FIG. 7. The CDMA and WCDMA standards regarding noise requirements tend to focus on areas of noise reduction outside of the transmission frequency bands of the carriers. As a result, the CDMA and WCDMA standards are easier to comply with regarding noise requirements than the GSM standard since the GSM standard addresses noise from each of the numerous carrier signals within its frequency band. For instance, the GSM standard for operating with a 890 MHz to 915 MHz uplink frequency band and 935 MHz to 960 MHz downlink frequency band has 124 pairs of individual carrier signals on separate frequencies, each with separate noise requirements regarding filtering or noise reduction. Consequently, conventional approaches in implementing the GSM standard typically use high-bit DACs. As an example, in a typical situation involving CDMA or WCDMA, an 8-bit or 9-bit DAC with simple post-conversion filtering would suffice. In contrast, in a typical situation involving GSM, a 10-bit or 12-bit DAC with more elaborate post-conversion filtering would be required. In this case, for GSM, if an 8-bit or 9-bit DAC were to be used, even more extensive and elaborate filtering would be required.

Conventional approaches that address use of cellular telephones with more than one communication standard, such as with GSM and WCDMA, struggle with the challenge of meeting the noise requirements of both standards as it relates to digital-to-analog conversion of signals internal to the cellular telephone. Some conventional approaches use a low-bit DAC for the CDMA noise requirements and an elaborate system of switchable filters when GSM is required. Other conventional approaches use dual communication paths having separate DACs directed to each communication standard. For instance, in a first communication path within a cellular telephone transmitter, one or more 8-bit or 9-bit DACs would be used for the CDMA or WCDMA technology whereas in a second communication path in the cellular telephone transmitter, one or more 10-bit or 12-bit DACs would be used for the GSM technology. Unfortunately, the conventional approaches have been relatively expensive and complicated to implement.

Accordingly, there is a significant need for a system and method for a transmitter in a wireless communication device, such as a cellular telephone, to operate under more than one communication standard without the need for switchable filters or multiple communication paths to address noise requirements of the multiple standards with particular respect to the one or more DACs used in the transmitter. The motivation for such a need include reduction of the costs and complexity associated with conventional approaches toward multi-standard transmitters. The present invention provides this and other advantages that will become apparent from the following detailed description and accompanying figures.

SUMMARY OF THE INVENTION

The present invention resides in a multi-standard transmitter system and method for a wireless communication system method for processing a digital baseband input signal having a phase deviation value and a desired signal content for signal transmission from a wireless communication system according to at least first and second communication standards. The first communication standard has a noise requirement and the second communication standard has a noise requirement less stringent than the noise requirement of the first communication standard.

Aspects of the system and method include an over-deviation phase multiplier configured to digitally multiply the phase deviation of the digital baseband input signal by a multiplication factor, M, to increase the phase deviation value of the digital baseband input signal by substantially M times the phase deviation value of the digital baseband input signal to output an over-deviated digital baseband signal substantially including the desired signal content.

Other aspects include a digital intermediate frequency up-converter configured to process the over-deviated digital baseband signal with respect to a sampling frequency, $F_S$, and an intermediate frequency, $F_{IF}$, to output an I quadrature signal and a Q quadrature signal being up-shifted from the over-deviated digital baseband signal. The I and Q quadrature signals include substantially the desired signal content in an up-shifted frequency range substantially centered on the intermediate frequency.

Further aspects include a first digital-to-analog converter (DAC) configured to convert the I quadrature signal to a first complex analog signal and a second DAC configured to convert the Q quadrature signal to a second complex analog signal. The first and second complex analog signals include substantially the desired signal content. The first and second DACs have inherent DAC noise in at least a portion of the frequency spectrum including the up-shifted frequency range of the desired signal content.

Further aspects include a first low pass filter configured to filter the first complex analog signal and output a first filtered analog signal and a second low pass filter configured to filter the second complex analog signal and output a second filtered analog signal. Additional aspects include an analog I/Q modulator configured to modulate the first a real analog signal having a phase deviation value and including substantially the desired signal content located in a second up-shifted frequency range substantially centered on a frequency having a value substantially equal to the sum of the intermediate frequency, $F_{IF}$, unwanted signal resulting from the modulation.

Other aspects include a limiter configured to amplitude limit a limiter input signal and thereby reduce an amplitude modulated noise component of the real analog signal. An over-deviation phase divider is configured to divide the phase deviation of an over-deviation input signal by a division factor of M to reduce remaining portions of the DAC noise and to reduce the unwanted signal. The over-deviation phase divider is further configured to bandpass the over-deviation input signal to further reduce the unwanted signal and thereby output a phase conditioned analog signal including reduced DAC noise and reduced unwanted signal. The phase conditioned analog signal has a phase deviation that is substantially 1/M of the phase deviation of the real analog signal, the combined power levels of the remaining DAC noise and the unwanted signal after processing are insufficient to violate the noise requirement of the first communication standard.

Other features and advantages of the invention will become apparent from the following detailed description, taken in conjunction with the accompanying drawings.

BRIEF DESCRIPTION OF THE DRAWINGS

FIG. 1 is a power-time-frequency plot illustrating principles related to prior art frequency division multiple access (FDMA) technology.

FIG. 2 is a power-time-frequency plot illustrating principles related to prior art time division multiple access (TDMA) technology.

FIG. 3 is a power-time-frequency plot illustrating principles related to prior art code division multiple access (CDMA) technology.

DETAILED DESCRIPTION OF THE PREFERRED EMBODIMENTS

Figure 4:
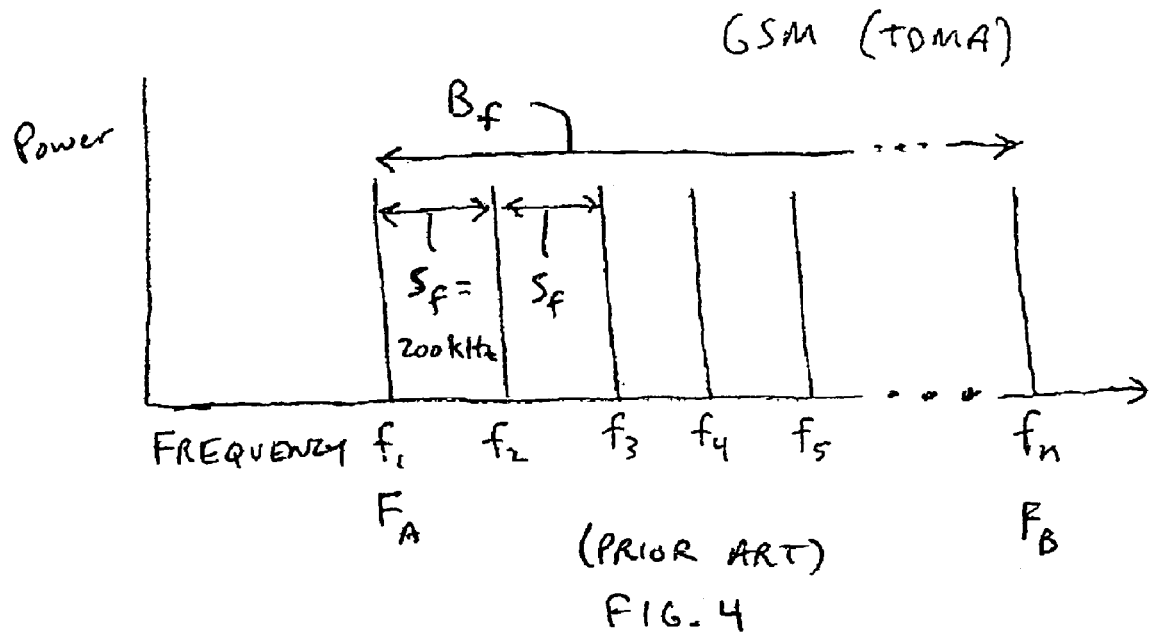
FIG. 4 is a power-frequency plot illustrating a frequency band containing individual carrier frequencies of a prior art GSM standard being a particular form of TDMA technology.
Figure 5:
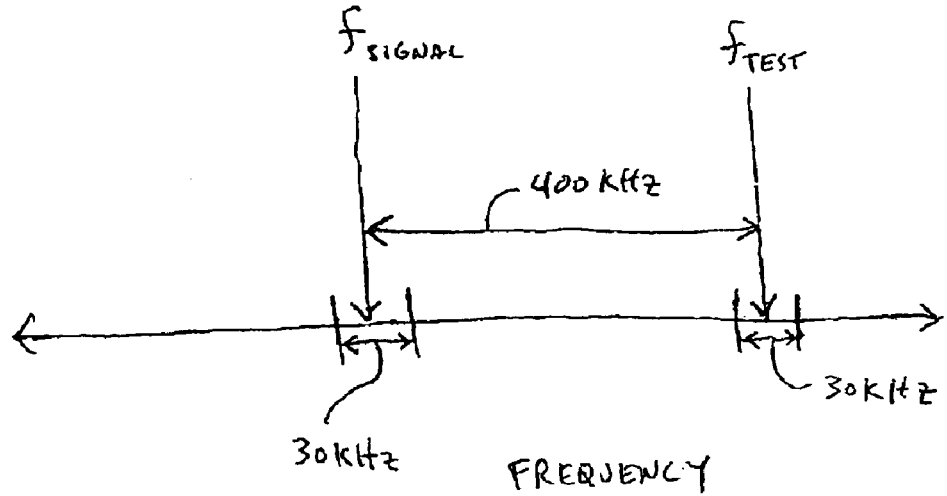
FIG. 5 is a frequency plot illustrating test specifications for noise requirements related to the prior art GSM standard.
Figure 6:
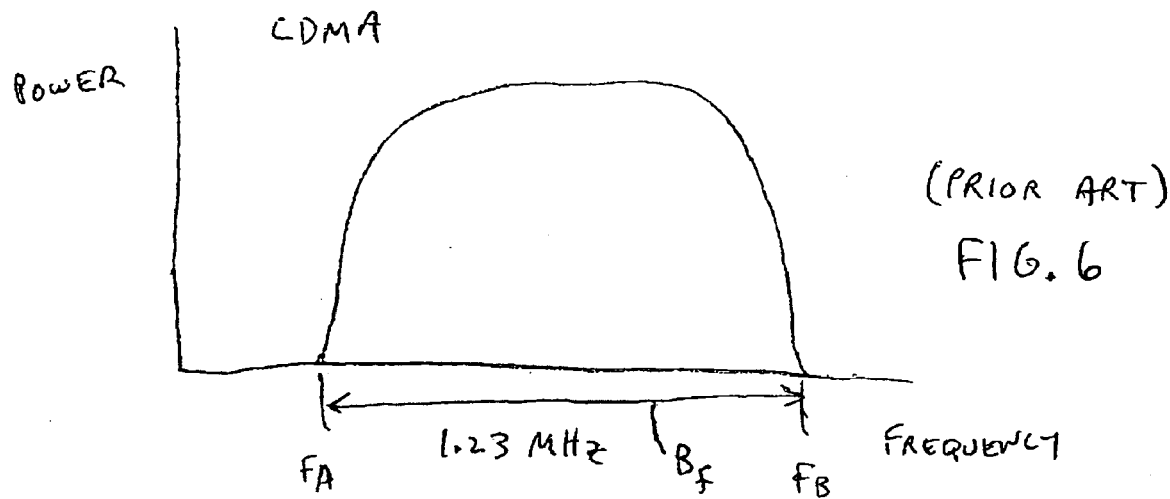
FIG. 6 is a power-frequency plot illustrating a frequency band of a single carrier of prior art second generation CDMA technology.
Figure 7:
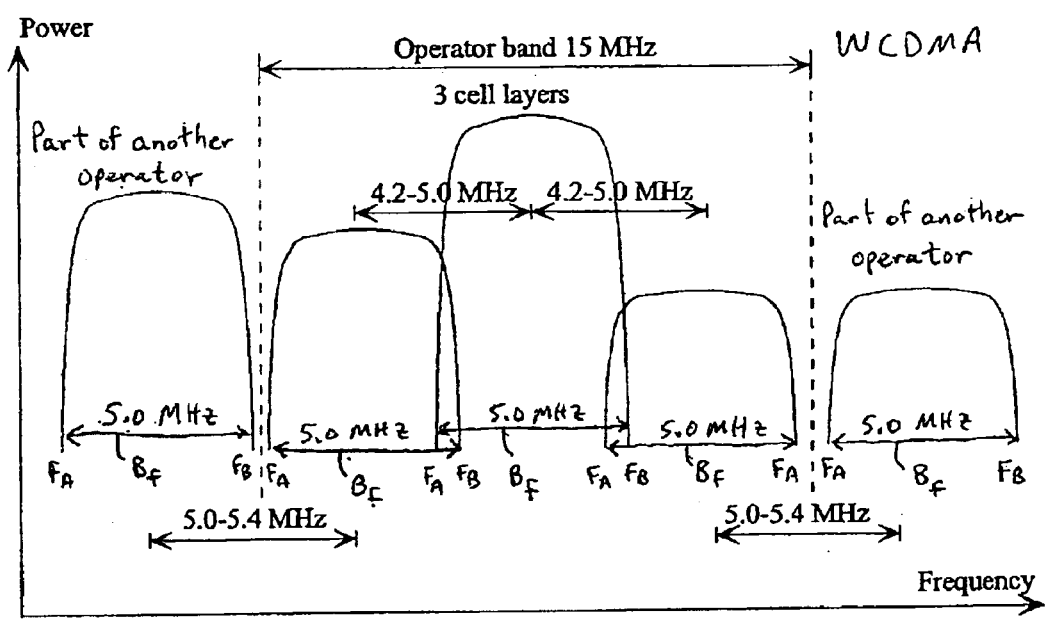
FIG. 7 is a power-frequency plot illustrating transmission frequency bands of multiple carriers found in adjacent operator bands of prior art third generation WCDMA technology.

The present invention provides a system and method for a transmitter to mitigate signal noise to meet specifications of multiple communication standards without extensive multiple internal transmitter communication pathways or extensive transmitter filtering systems and components as found in conventional prior art dual-standard transmitters. Although the examples presented herein relate to specific communication standards, the principles of the present invention are generally applicable to multiple forms of wireless communication. Furthermore, examples presented herein may refer to cellular telephones. However, this term is used for convenience and the present invention is applicable to cellular, PCS, and other forms of communication that may be referred to generically as wireless communication devices.

The present invention also allows for potentially lower cost components, in particular, relatively low-bit DACs, to support the multiple communication standards including one or more communication standards that would require much higher cost components, in particular, relatively high-bit DACs under conventional approaches. Consequently, with the same potentially lower cost components generally configured in a single communication pathway, to satisfy both demanding and less demanding communication standards. This is in contrast to conventional approaches, where, at most, only the less demanding communication standard could be satisfied.

According to embodiments practiced of the present invention, upon reception of a complex digital baseband form of a desired signal by a transmitter, the phase deviation of the desired signal is significantly increased through a phase multiplier by a multiplier factor referred herein as M. The desired signal is subsequently up-shifted to an intermediate frequency. As illustrated in an exemplary embodiment below, up-shifting moves the desired signal on the frequency spectrum away from one or more unwanted signals generated as a consequence of a subsequent modulation process that converts the desired signal from an analog complex form to an analog real form.

Significant amounts of undesirable noise are added into the complex baseband signal, especially by relatively low-bit DACs, as the desired signal passes through the communication pathway of the transmitter. Due to use of lower cost components, such are lower-bit DACs, for some functions conventionally performed by higher cost components, the noise introduced may be of higher levels than some conventional approaches allow. To counteract this undesirable introduction of noise, most of the noise is later removed by methods and systems of the present invention, thereby leaving an inconsequential level of noise or unwanted signals.

As discussed further below, the noise has an amplitude modulated noise component and a phase modulated noise component. In the latter stages of travel by the desired signal through the transmitter, toward the output end of the transmitter, the noise added to the desired signal is reduced to inconsequential levels. The amplitude modulated noise component of the unwanted noise is substantially reduced by a limiter, which is of relatively low cost compared to conventional approaches for noise reduction. A limiter translates portions of signals above a threshold into a substantially non-zero constant value and below a threshold into a substantially zero value. The phase modulated noise component of the unwanted noise is substantially reduced by a phase divider. The phase divider not only divides the phase modulated noise component, but also divides the phase deviation of the desired signal. As planned, since phase deviation of the desired signal was previously significantly increased by a multiplier factor of M by a phase multiplier upon initial entry of the desired signal into the transmitter, dividing phase deviation of the desired signal by a dividing factor of M essentially restores the initial phase deviation that the desired signal had at the time of its entry into the transmitter. Significantly, dividing the phase modulated noise component by a dividing factor of M reduces the phase modulated noise component to an inconsequential level.

Both the limiter and the phase divider are, in general, approaches to noise reduction that are not tailored to any one particular communication standard. As a consequence, multiple internal communication paths within the transmitter and elaborate filtering systems directed to a particular communication standard are not needed nor desired.

As an example, an exemplary embodiment of a transmitter supports versions of the GSM communication standard and the WCDMA communication standard, which share portions of the frequency spectrum. Other embodiments can support multiple communication standards that do not share portions of the frequency spectrum by directing noise reduction efforts associated with a collective transmission frequency band aggregated from the individual transmission frequency bands of the separate communication standards and explained further below. Generally, a single internal communication path is used within the transmitter rather than multiple internal communication paths found in conventional approaches. Filtering is done mainly with a simple single pole passive low pass filter directed to a large aggregate transmission frequency band composed of transmission frequency bands for the WCDMA communication standard and the GSM communication standard. Although conventional transmitter approaches for supporting GSM typically involve elaborate filtering systems, in this exemplary embodiment both GSM and WCDMA are both supported, even though the elaborate conventional filtering systems are not needed and are not desired.

Accordingly, implementations generally include an over-deviation phase multiplier configured to digitally multiply the phase deviation of the digital baseband input signal by a multiplication factor, M. Consequently, the phase deviation value of the digital baseband input signal is increased by substantially M times the phase deviation value of the digital baseband input signal to output an over-deviated digital baseband signal substantially including the desired signal content.

General implementations further include a digital intermediate frequency up-converter configured to process the over-deviated digital baseband signal with respect to a sampling frequency, $F_S$, and an intermediate frequency, $F_{IF}$. Consequently, an I quadrature signal and a Q quadrature signal are up-shifted from the over-deviated digital baseband signal, and the I and Q quadrature signals include substantially the desired signal content in an up-shifted frequency range substantially centered on the intermediate frequency.

Also, generally included are digital-to-analog converters (DACs) configured to convert the I an Q quadrature signals to first and second complex analog signals. The first and second complex analog signals include substantially the desired signal content, but the first and second DACs having inherent DAC noise in at least a portion of the frequency spectrum including the up-shifted frequency range of the desired signal content. An over-deviation phase divider is generally provided to divide the phase deviation of an over-deviation input signal by a division factor of M to reduce remaining portions of the DAC noise and to reduce the unwanted signal.

Figure 8:
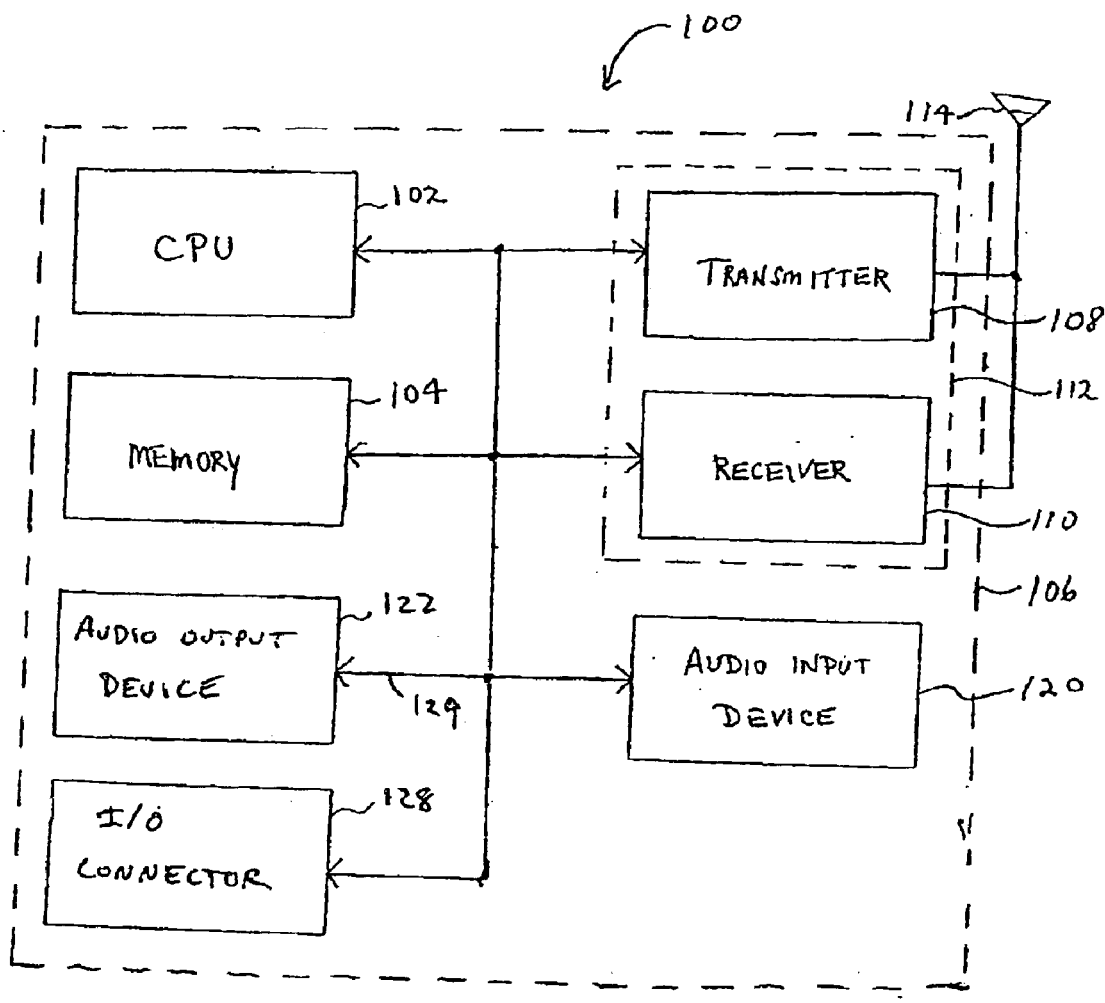
FIG. 8 is a functional block diagram of a system implementing the present invention.

As shown in the drawings for purposes of illustration, the present invention is embodied in a system 100 illustrated in the functional block diagram of FIG. 8. The system 100 includes a central processing unit (CPU) 102, which controls operation of the system. Those skilled in the art will appreciate that the CPU 102 is intended to encompass any processing device capable of operating the telecommunication system. This includes microprocessors, embedded controllers, application specific integrated circuits (ASICs), digital signal processors (DSPs), state machines, dedicated discrete hardware, and the like. The present invention is not limited by the specific hardware component selected to implement the CPU 102.

The system also preferably includes a memory 104, which may include both read-only memory (ROM) and random access memory (RAM). The memory 104 provides instructions and data to the CPU 102. A portion of the memory 104 may also include nonvolatile random access memory (NVRAM), such as flash RAM.

The system 100, which is typically embodied in a wireless communication device also includes a housing 106 that contains a transmitter 108 and a receiver 110 to allow transmission and reception of data, such as audio communications, between the system 100 and a remote location, such as a base station (not shown). The transmitter 108 and receiver 110 may be combined into a transceiver 112. An antenna 114 is attached to the housing 106 and electrically coupled to the transceiver 112. Component and operational details of the transmitter 108 will be described further below. The operation of the receiver 110, and the antenna 114 is well known in the art and need not be described herein except as it relates specifically to the present invention.

The system 100 also includes an audio input device 120, such as a microphone, and an audio output device 122, such as a speaker. The audio input device 120 and audio output device 122 are generally mounted in the housing 106. Additional components may also be used in a conventional manner depending on the type of wireless communication device. For example, an analog cellular telephone does not require the digitization of any audio data. In contrast, a digital wireless communication device will require additional components to convert analog audio data to digital form. Although not specifically illustrated in FIG. 1, the audio input device 120 is coupled to an analog-to-digital converter (ADC) which converts analog audio signals to digital form if the system 100 is implemented in a digital wireless communication device. The ADC may be a portion of a voice encoding system, generically referred to as a VOCODER, which encodes the audio data in a known fashion. Similarly, the audio output device 122 is coupled to a digital-to-analog converter (DAC), which converts digital audio data to analog form.

The audio output device 122, which is sometimes referred to as a receiver (not to be confused with the receiver 110), may be replaced by an external device (not shown). In an exemplary embodiment, the system 100 may be coupled to external audio devices via an input-output (I/O connector 128). The I/O connector 128 provides a port for audio input and output and may further provide access to control signals and other operational components, such as a keyboard (not shown).

The various components of the system 100 are coupled together by a bus system 129, which may include a power bus, a control signal bus, and a status signal bus in addition to a data bus. However, for the sake of clarity the various buses are illustrated in FIG. 1 as the bus system 129.

One skilled in the art will appreciate that the system 100 illustrated in FIG. 1 is a functional block diagram rather than a listing of specific components. Also, separate functional blocks within the system 100 may, in fact, be embodied in one physical component, such as a digital signal processor (DSP). They may also reside as program codes in the memory 104, such code being operated on by the CPU 102. The same considerations may apply to other components listed in the system 100 of FIG. 1.

In general, aspects of the present invention are combined to ultimately convert a complex digital baseband signal contained within a narrow baseband portion of the frequency spectrum to a real analog signal being modulated on a carrier wave having a transmission frequency, $F_{RF}$. The present invention is directed at supporting more than one communication standard with different noise reduction requirements without the need for multiple internal communication paths or elaborate filtering systems within a transmitter, such as those that are only activated when a particular communication standard is being supported.

Figure 9:
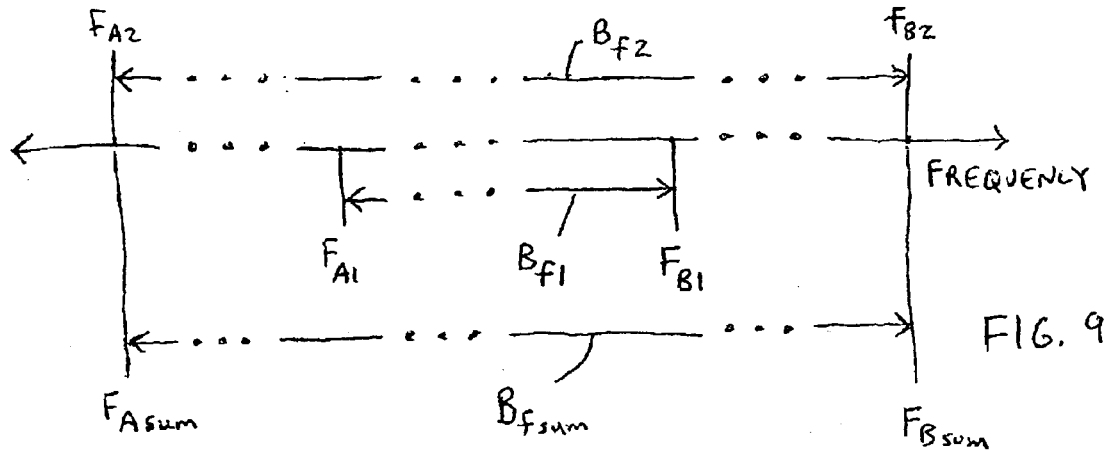
FIGS. 9–11 are frequency plots illustrating various scenarios for sharing of the frequency spectrum by more than one frequency band of more than one cellular communication standard.
Figure 10:
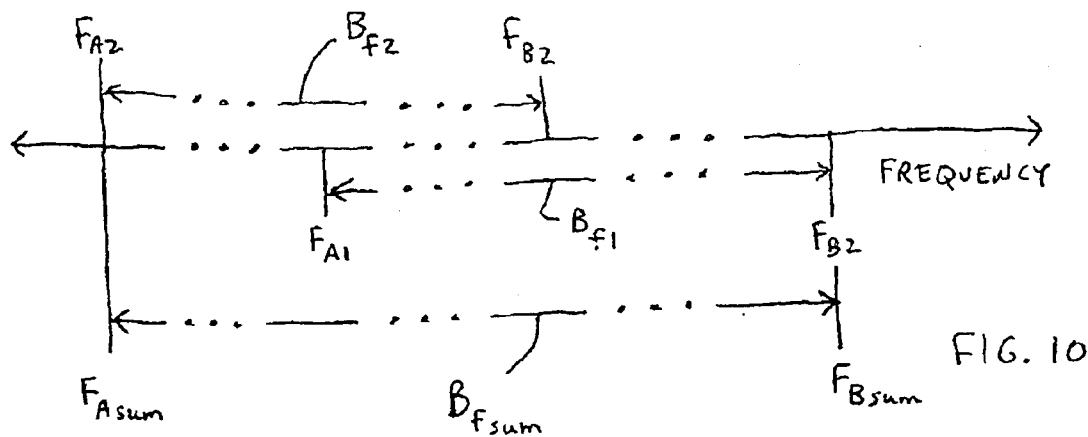
Figure 11:
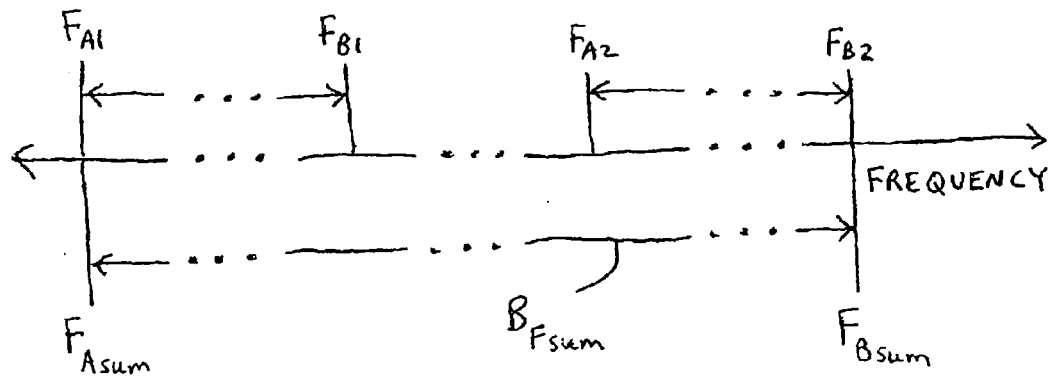

General principles of implementation for the transmitter 108 of the system 100 are illustrated by FIGS. 9–11 where $B_{f1}$ and $B_{f2}$ each represent a frequency band from first and second communication standards, respectively and are shown with varying degrees of overlap as repesentative examples of different possible frequency sharing scenarios. In general, the present invention seeks to reduce signal levels outside of one or more transmission frequency bands that are part of at least one communication standard supported by the transmitter 108. The simplest approach generally taken by the present invention is to exclude signal levels in frequencies that would otherwise by subsequently up-shifted as part of preparation for transmission to frequencies either below or above any of the transmission frequency bands of any of the supported communication standards. If there are gaps between transmission frequency bands of the communication standards, generally signal levels that would subsequently be up-shifted into these frequency gaps will not be rejected in the simpler embodiments because more elaborated stages of filtering would typically be required. For instance, as illustrated in FIGS. 9–11, simple filtering systems would be used to filter out signal levels that would have been otherwise up-shifted to frequencies in the frequency spectrum outside the aggregate frequency band designated by $B_{fsum}$. For instance, the transmitter 108 may need to support a version of the GSM standard having uplink and downlink transmission frequency bands each having a 25 MHz bandwidth and operating in an 1800 or 1900 MHz area of the frequency spectrum and may also need to support a version of the WCDMA standard with transmission operator bands each having a 15 MHz bandwidth and also operating in an 1800 or 1900 MHz area of the frequency spectrum. The appropriate $B_{fsum}$ would be determined in order to provide an appropriate simple filtering system to exclude signals that would have otherwise been subsequently up-shifted to either below or above any transmission frequency bands of the supported versions of the GSM and WCDMA communication standards.

Figure 12:
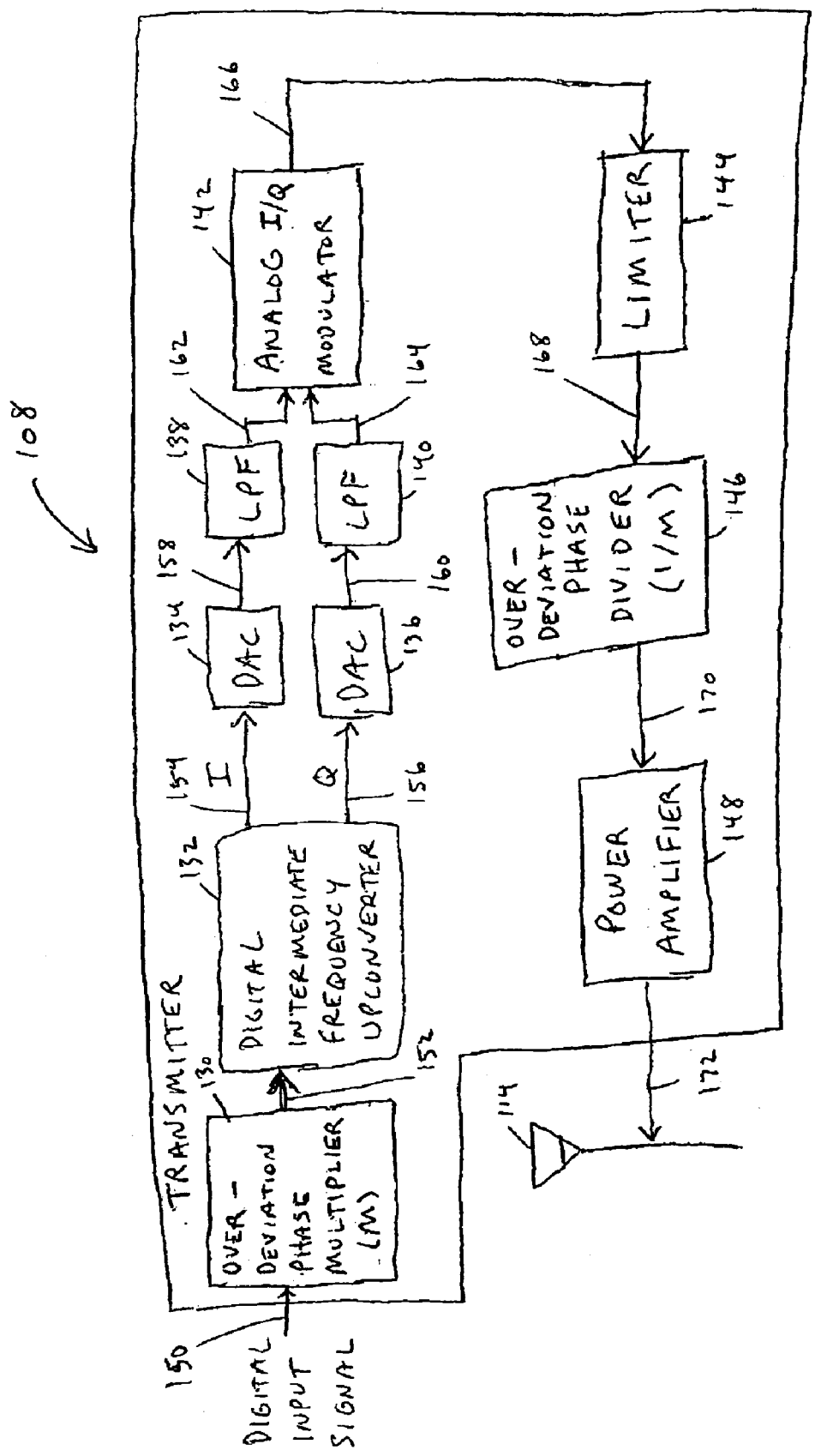
FIG. 12 is a functional block diagram generally depicting a transmitter of the present invention.

According to the present invention, as shown in FIG. 12, the transmitter 108 includes an over-deviation phase multiplier 130, a digital intermediate frequency up-converter 132, first and second DACs 134 and 136, first and second low pass filters (LPF) 138 and 140, an analog I/Q modulator 142, a limiter 144, an over-deviation phase divider 146, and a power amplifier 148. The over-deviation phase multiplier 130 receives a digital baseband input signal 150 and digitally multiplies the received digital input baseband signal by a multiplier factor of M. This results in an increase of phase deviation of the digital input baseband signal 150 by the multiplier factor of M to generate an over-deviated digital baseband signal 152.

The digital intermediate frequency up-converter 132 then receives the over-deviated digital baseband signal 152 and converts it to I and Q quadrature signals 154 and 156. The digital intermediate frequency up-converter 132 generally up-shifts the frequency content of the desired I and Q quadrature signals 154 and 156 to move them away from undesired signals on the frequency spectrum as further elaborated below. The I and Q quadrature signals 154 and 156 are then converted by the first and second DACs 134 and 136, respectively, into first and second complex analog signals 158 and 160, respectively. Aspects of the present invention allow the first and second DACs 134 and 136 to have a bit-level no higher than required to support the least demanding of the communication standards supported by the transmitter 108. The first and second complex analog signals 158 and 160 are then sent to the first and second low pass filters 138 and 140, respectively, to filter out unwanted signals and noise in frequency ranges that would have otherwise been up-shifted into the transmission frequency bands associated with the supported communication standards to generate first and second filtered analog signals 162 and 164, respectively.

The analog I/Q modulator 142 receives the first and second filtered analog signals 162 and 164 for conversion into a real analog signal 166. At this point, the real analog signal 166 has amplitude modulated noise components and phase modulated noise components. The real analog signal 166 is first sent to the limiter 144, which reduces the amplitude modulated noise components of the real analog signal to produce an amplitude conditioned analog signal 168. The over-deviation phase divider 146 subsequently receives the amplitude conditioned analog signal 168 and processes the amplitude conditioned analog signal, in a manner described below, to reduce the phase modulated noise components thereby outputting a phase-noise reduced analog signal 170. The power amplifier 148 amplifies and then outputs a phase-noise reduced analog signal 172 to be transmitted by the antenna 114.

Figure 13:
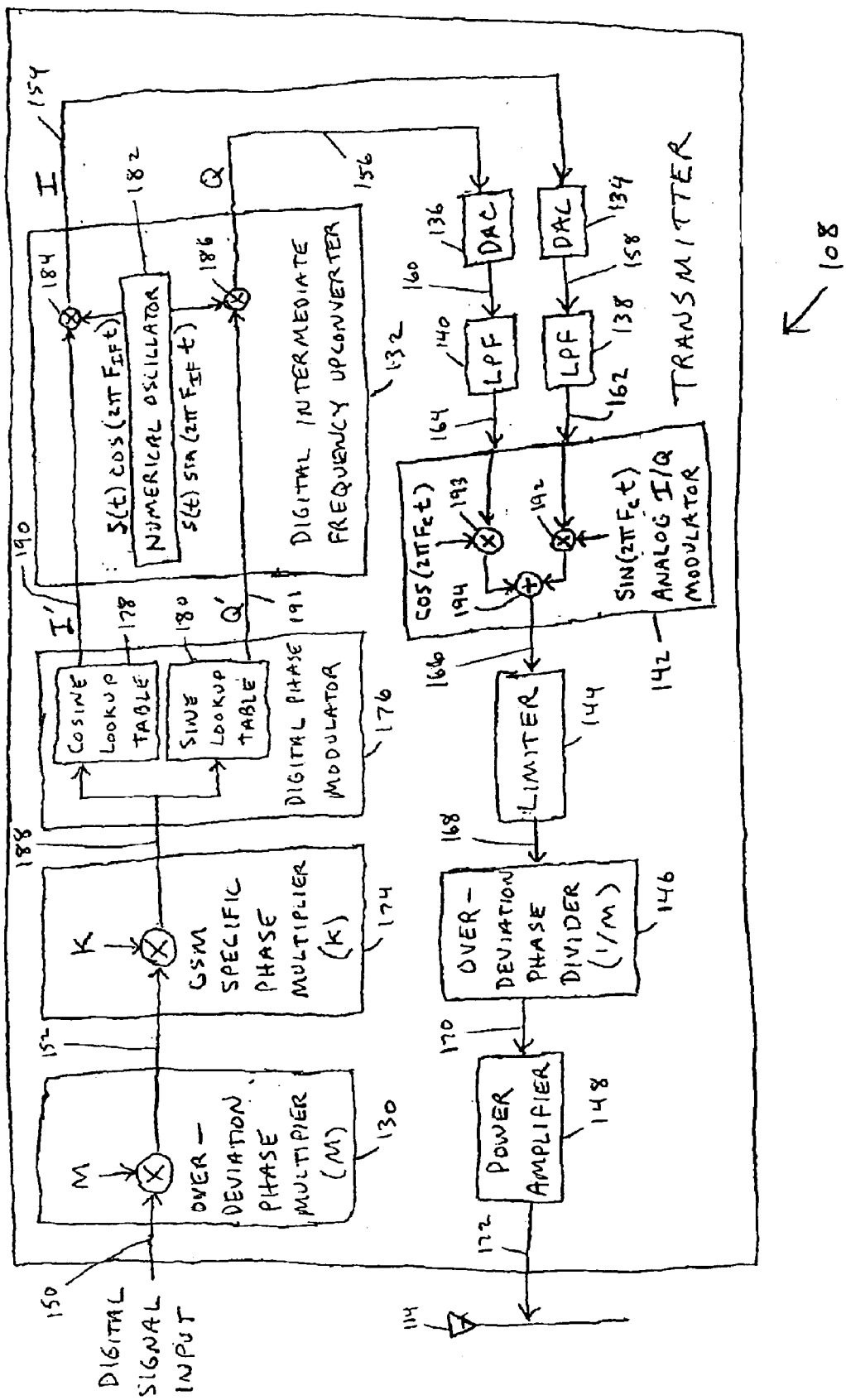
FIG. 13 is a schematic diagram illustrating an embodiment of the transmitter shown in FIG. 12 including an I-Q quadrature embodiment of a digital intermediate frequency up-converter and a GSM specific phase multiplier.

An exemplary embodiment of the transmitter 108 configured to support the GSM communication standard and at least one additional communication standards such as the WCDMA communication standard is shown in FIG. 13. The transmitter 108 includes a GSM specific phase multiplier 174, which, when activated to support the GSM communication standard, digitally multiplies the over-deviated digital baseband signal 152 outputted by the over-deviation phase multiplier 130 by a multiplier factor of K, which is a modulation index determined by the GSM standard to output a GSM phase modulated signal 188. This exemplary embodiment of the transmitter 108 also includes a digital phase modulator 176 that uses trigonometric based cosine and sine lookup tables 178 and 180 to produce initial I and Q quadrature signals 190 and 191, respectively. The cosine and sine lookup tables 178 and 180 output the magnitudes of cosine and sine, respectively, of inputted values of the phase deviation of the GSM phase modulated signal 188.

The initial I and Q quadrature signals 190 and 191 are then sent to the digital intermediate frequency up-converter 132 for conversion into the I and Q quadrature signals 154 and 156, respectively. In this exemplary embodiment, the digital intermediate frequency up-converter 132 includes a numerical oscillator 182, and first and second multipliers 184 and 186, respectively. The numerical oscillator 182 can be a coordinate rotation digital computer (CORDIC) or a direct digital synthesizer whose general operational principles are known in the art. The numerical oscillator 182 has a first output signal, $S(t) \cdot \cos(2\pi \cdot F_{IF} \cdot t)$, and a second output signal, $S(t) \cdot \sin(2\pi \cdot F_{IF} \cdot t_N)$ wherein $F_{IF}$ is the intermediate frequency, t is the time variable, and sin( ) and cos( ) are trigonometric functions. S(t) is a sample function that outputs a non-zero valued pulse every sampling period, $T_S$, with a sampling frequency, $F_S$. The first output signal joins the initial I quadrature signal component 190 at a first multiplier 184 where the signals are multiplied together relative to the time domain or convolved in the frequency domain to produce the I quadrature signal 154. The second output signal joins the initial Q quadrature signal 191 of the complex baseband signal at the second multiplier 186 to produce the Q quadrature signal 156.

As an example, if the initial I and Q quadrature signals 190 and 191 have a bandwidth of 200 kHz, they could be sampled at a sampling frequency, $F_S$, for example, 10 MHz, thereby satisfying the Nyquist criteria, whereas the data rate of the system 100 may be in the 1 MHz range. The sampling frequency, $F_S$, is typically chosen, in some embodiments, to be an even multiple of the data rate (a.k.a., the chipping rate or symbol rate) of the system 100, which allows the Nyquist criteria for retaining information content of a sampled signal to be satisfied. For example, one chipping rate used with WCDMA systems is equal to 3.84 MHz. To assist in isolation of desired signals from noise or unwanted signals, the sampling frequency, $F_S$, is selected to space desired and unwanted signals sufficiently far from one another along the frequency spectrum. The intermediate frequency, $F_{IF}$, is selected to further assist in separation of the desired and unwanted signals along the frequency spectrum. To ensure that desired and unwanted signals are spaced sufficiently far from one another, the sampling frequency, $F_S$, is chosen to be relatively high. As mentioned above, typically in some embodiments, the sampling frequency is chosen to be an even multiple, such as a multiple of four or eight, of the data rate (a.k.a., chipping rate or symbol rate) of the system 100. To further assist in separating desired and unwanted signals, the intermediate frequency, $F_{IF}$, typically in some embodiments, is equal to one-fourth of the sampling frequency, $F_S$. For example, if the sampling frequency was 10 MHz, the intermediate frequency would be approximately 2.5 MHz in these embodiments.

Figure 15:
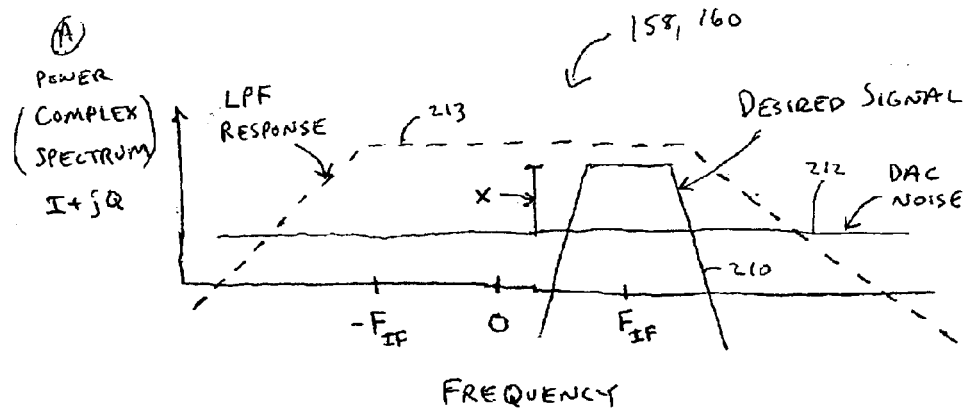
FIG. 15 is a power-frequency plot illustrating signal components of a complex analog signal outputted by a pair of DACs shown in FIGS. 12 and 13 and also illustrating a filter response of a pair of low pass filters also shown in FIGS. 12 and 13.

As illustrated in FIG. 15, the power spectra of the first and second complex analog signals 158 and 160 includes a desired signal 210 and DAC noise 212 originating from the first and second DACs 134 and 136. The DAC noise 212 has amplitude modulated components and phase modulated components. As shown in FIG. 15, the desired signal 210 is offset from the zero origin along the frequency spectrum by the intermediate frequency, $F_{IF}$, used by the digital intermediate frequency up-converter 132. The magnitude of the desired signal 210 is greater than the DAC noise 212 by an amount represented by X in FIG. 15, which is based upon the linearity of the first and second DACs 134 and 136. For exemplary embodiments of the transmitter 108 configured to support both the GSM communication standard and the WCDMA communication standard, the first and second DACs 134 and 136 are generally 8-bit with nonlinearity equal to approximately one least significant bit or with linearity of approximately 7½ bits. Other embodiments use a 9-bit DAC with resultant higher linearity. This is contrasted with conventional approaches supporting the GSM communication standard which typically use 10 or 12 bit DACs. Also shown in FIG. 15 is a LPF filter response 213 for the first and second low pass filters 138 and 140 showing rejection in frequencies above the desired signal 210 and in negative frequencies ranges also not including the desired signal. The LPF filter response 213 is set to have a wide enough bandwidth to allow for multi-mode operation using more than one communication standard without the need for rejection of selectively chosen frequencies that would be otherwise up-shifted into one or more transmission frequency bands of the supported communication standards, typically requiring elaborate filtering of conventional approaches.

Figure 16:
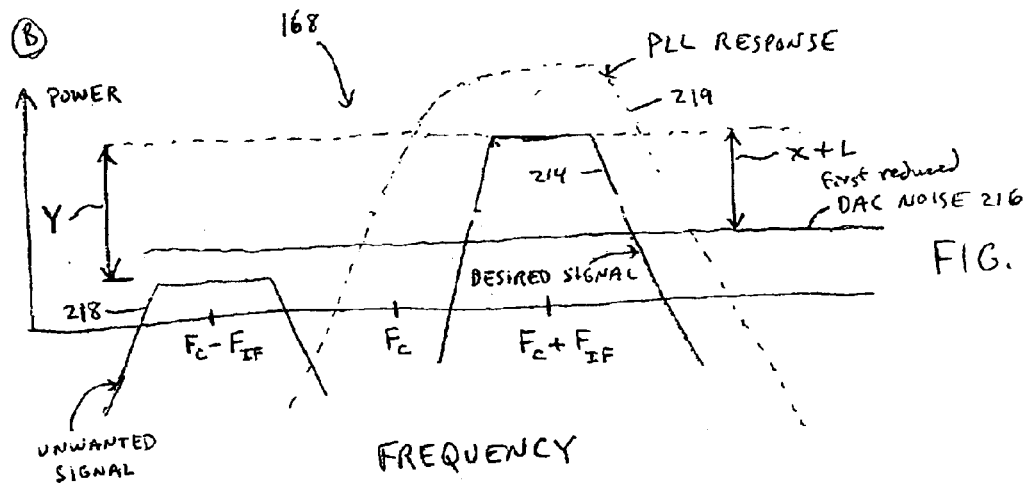
FIG. 16 is a power-frequency plot illustrating signal components of a real analog signal outputted by a limiter shown in FIGS. 12 and 13 and a signal response curve for a phase locked loop circuit shown in FIG. 14.

The exemplary embodiment of the transmitter 108 depicted in FIG. 13 also includes a particular form of the analog I/Q modulator 142 wherein a first multiplier 192 multiplies the first filtered analog signal 162 by a trigonometric function $\cos(2\pi \cdot F_C \cdot t)$ to produce a first product signal, a second multiplier 194 multiplies the second filtered analog signal 164 by a trigonometric function $\sin(2\pi \cdot F_C \cdot t)$ to produce a second product signal, and the summer 194 sums the first and second product signals to produce the real analog signal 166. FIG. 16 illustrates a power-frequency plot of the amplitude conditioned analog signal 168, which includes a desired signal 214, limiter reduced DAC noise 216, and an unwanted signal 218. Due to noise reduction of amplitude modulated noise by the limiter 144, the magnitude of the limiter reduced DAC noise 216 is less than the magnitude of the desired signal 214 by an amount represented by X+L in FIG. 16. The magnitude of the unwanted signal 218 is less than the magnitude of the desired signal 214 by an amount represented by Y in FIG. 16, which is dependent upon the analog I/Q modulator 142. The unwanted signal 218 is due to finite image rejection in the analog I/Q modulator 142. In converting the first and second filtered analog signals 162 and 164 to the real analog signal 166, the analog I/Q modulator 142 up-shifts the real analog signal 166 by the frequency, Fc. Due to the nature of the intermediate frequency, $F_{IF}$, introduced by the digital intermediate frequency up-converter 132, the unwanted signal 218 is substantially centered on a frequency that is separated from the center frequency of the desired signal by approximately two times the intermediate frequency.

Figure 14:
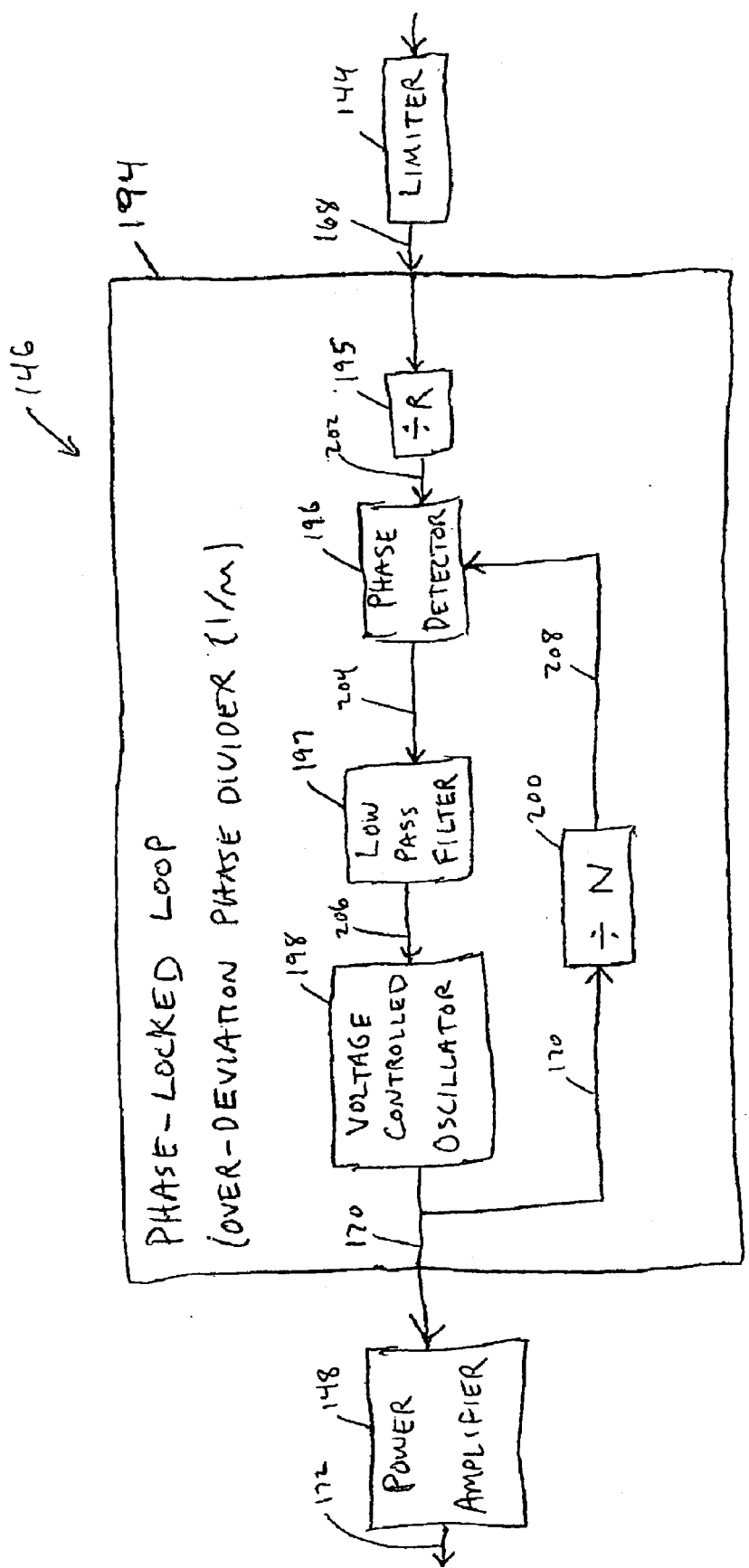
FIG. 14 is a functional block diagram of a phase locked loop circuit used in an embodiment of an over-deviation phase divider shown in FIGS. 12 and 13.

A particular embodiment of the over-deviated phase divider 146 uses a phase-locked loop (PLL) 194, shown in FIG. 14, which includes an initial divider 195 having a division factor of R, a phase detector 196, a low pass filter 197, a voltage controlled oscillator 198, and a second divider 200 having a division factor of N, arranged according to conventional principles of phase-locked loops. Typically, values are chosen for the initial divider 195 and the second divider 200 such that N/R=1/M, also known as the dividing factor of M, to undo the phase related over-deviation multiplier factor M introduced by the over-deviation phase multiplier 130. Other embodiments of the over-deviation phase divider utilize a translational loop or an offset phase-locked loop, whose operation is conventionally known, which are also set to divide the phase deviation of the amplitude conditioned analog signal 168 by the multiplier factor of M. The voltage controlled oscillator 198 is used in an up-conversion process in which the transmission related radio frequency, $F_{RF}$, is typically in some embodiments, in the 800, 900, 1800, or 1900 MHz regions of the radio frequency spectrum.

The phase-locked loop 194 actively selects a region of the frequency spectrum of the desired signal 214, as shown by the PLL filter response 219 in FIG. 16 to bandpass filter and further isolate the desired signal from other signals and noise including the limiter reduced DAC noise 216 and the unwanted signal 218. Furthermore, the phase-locked loop 194 up-converts the amplitude conditioned analog signal 168 into the phase reduced analog signal 170 to be centered on the transmission related radio frequency, $F_{RF}$. The phase reduced analog signal 170 is subsequently amplified by the power amplifier 148 and sent on to the antenna 114 for transmission.

Figure 17:
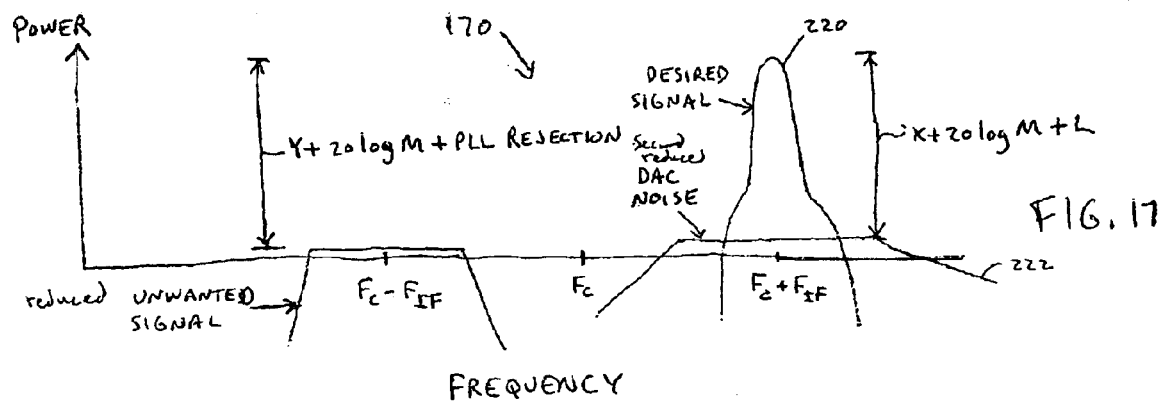
FIG. 17 is a power-frequency plot illustrating signal components of a real analog signal outputted by the over-deviation phase divider shown in FIGS. 12 and 13 and embodied as the phase locked loop circuit shown in FIG. 14.

As depicted by a representative example illustrated in FIG. 17, the phase-noise reduced analog signal 170 has signal components including a desired signal 220, divider reduced DAC noise 222, and a reduced unwanted signal 224. The desired signal 220 has a more pronounced peak with its maximum amplitude occupying a smaller bandwidth than the desired signal 210 of the first and second complex analog signals 158 and 160 and the desired signal 212 of the amplitude conditioned analog signal 168 due to the phase-locked loop 194 acting as a phase divider. As noted in FIG. 17, the maximum magnitude of the desired signal 220 of the phase-noise reduced analog signal 170 is greater than the maximum magnitude of the divider reduced DAC noise 222 of the phase reduced analog signal by the X difference (shown in FIG. 15 and FIG. 16) plus 20 log M. Also, the maximum magnitude of the desired signal 220 of the phase-noise reduced analog signal 170 is greater than the maximum magnitude of the reduced unwanted signal 224 of the phase-noise reduced analog signal by the Y difference (shown in FIG. 16) plus 20 log M and plus other signal and noise rejection inherent with additional filtering aspects of the phase-locked loop 194. As a result, the magnitude levels of the divider reduced DAC noise 222 and the reduced unwanted signal 224 of the phase-noise reduced analog signal 170 are inconsequential compared with the magnitude levels of the desired signal 220.

One skilled in the art will appreciate that the transmitter 108 illustrated in FIGS. 12–14 is a functional block diagram rather than a listing of specific components. For example, although the digital intermediate frequency up-converter 132 and the first and second DACs 134 and 136 are illustrated as three separate blocks within the transmitter 108, they may be in fact embodied in one physical component, such as a digital signal processor (DSP). Also, in some embodiments, the order of some of the signal processing could be changed such as the limiter 144 may be placed after the over-deviation phase divider 146. They may also reside as program codes in the memory 104, such code being operated on by the CPU 102. The same considerations may apply to other components listed for the transmitter 108 of FIGS. 12–14.

It is to be understood that even though various embodiments and advantages of the present invention have been set forth in the foregoing description, the above disclosure is illustrative only, and changes may be made in detail yet remain within the broad principles of the invention. Therefore, the present invention is to be limited only by the claims.

What is claimed is:

1. A signal processing system for noise reduction comprising:
   an over-deviation phase multiplier having a multiplication factor, M;
   a digital intermediate frequency up-converter;
   first and second digital-to-analog converters (DACs); and
   an over-deviation phase divider having a division factor of M.

2. The system of claim 1, further comprising a limiter.

3. The system of claim 1 wherein the over-deviation phase multiplier further includes a GSM specific phase multiplier having a multiplication factor, K.

4. The system of claim 1 wherein the digital intermediate frequency up-converter further includes a digital phase modulator having trigonometric lookup tables.

5. The system of claim 1 wherein the digital intermediate frequency up-converter further includes a numerical oscillator.

6. The system of claim 1 wherein the over-deviation phase divider is one of the following: a translational loop and an offset phase-locked loop.

7. The system of claim 1 wherein the over-deviation phase divider is a phase-locked loop.

8. The system of claim 7 wherein the phase-locked loop further comprises an initial divider with a division factor of R and a second divider with a division factor of N, the values of the division factor of R and the division factor of N such that N/R=1/M.

9. The system of claim 1 wherein M is so chosen to meet the noise requirements of the GSM communication standard and the first and second DACs are chosen to meet the noise requirements of the WCDMA communication standard.

10. A signal processing system for noise reduction comprising:
    an over-deviation phase multiplier having a multiplication factor, M.
    one or more digital-to-analog converters (DACs) having DAC noise in noncompliance with a selected communication standard; and
    an over-deviation phase divider having a division factor of M such that remaining DAC noise complies with the selected communication standard.

11. The system of claim 10, further comprising a limiter.

12. The system of claim 10 wherein the selected communication standard is the WCDMA standard.

13. The system of claim 10, further comprising a digital intermediate frequency up-converter.

14. A signal processing system for noise reduction comprising:
    a digital intermediate frequency up-converter configured according to a sampling frequency, $F_S$, and an intermediate frequency, $F_{IF}$;
    a plurality of digital-to-analog converters (DACs);
    an analog I/Q modulator for analog modulation according to a second modulation frequency, $F_C$, and the intermediate frequency, $F_{IF}$; and
    a bandpass filter configured to reduce the power content of an unwanted signal produced by the analog I/Q modulator to comply with a WCDMA communication standard wherein the digital intermediate frequency up-converter is further configured such that the intermediate frequency, Fif, is substantially one-quarter of the sample frequency, Fs.

15. The system of claim 14 wherein the wireless communication system has a data rate and the sampling frequency, $F_S$, is approximately an even multiple of the data rate.

16. The system of claim 14 wherein the digital intermediate frequency up-converter further comprises a numerical oscillator configured to output to signals described, in part, by two or more terms involving trigonometric functions of the intermediate frequency, $F_{IF}$.

17. The system of claim 14 wherein the digital intermediate frequency up-converter further includes a digital phase modulator having trigonometric lookup tables.

18. A signal processing system for noise reduction comprising:
    means for digitally multiplying the phase deviation of a digital baseband input signal by a multiplication factor, M, to output an over-deviated digital baseband signal substantially including a desired signal of the digital baseband input signal;
    means for processing the over-deviated digital baseband signal with respect to a sampling frequency, $F_S$, and an intermediate frequency, $F_{IF}$, to output an I quadrature signal and a Q quadrature signal being up-shifted from the over-deviated digital baseband signal, the I and Q quadrature signals including substantially the desired signal content in an up-shifted frequency range substantially centered on the intermediate frequency, $F_{IF}$;
    means for digital-to-analog conversion (DAC) to convert the I quadrature signal to a first complex analog signal and convert the Q quadrature signal to a second complex analog signal, the first and second complex analog signals including substantially the desired signal content, the means for DAC having inherent DAC noise in at least a portion of the frequency spectrum including the up-shifted frequency range of the desired signal content; and
    means for diving the phase deviation of an over-deviation input signal by a division factor of M.

19. The system of claim 18 wherein the means for digitally multiplying further includes a means for GSM specific phase multiplying having a multiplication factor, K, to increase the phase deviation value of the digital baseband input signal such that the phase deviation value of over-deviated digital baseband signal is substantially M times K greater than the phase deviation value of the digital baseband input signal.

20. The system of claim 18 wherein the means for processing the over-deviated digital baseband signal further includes a means for converting the over-deviated digital baseband signal into initial I and Q quadrature signals by using trigonometric lookup tables to be processed with respect to the sampling frequency, $F_S$, and the intermediate frequency, $F_{IF}$.

21. The system of claim 18 wherein M is so chosen to meet the noise requirements of the GSM communication standard and the means for DAC is chosen to meet the noise requirements of the WCDMA communication standard.

22. A signal processing system for noise reduction comprising:
    means for digitally multiplying the phase deviation of a digital baseband input signal by a multiplication factor, M, to output an over-deviated digital baseband signal substantially including a desired signal of the digital baseband input signal;

means for digital-to-analog conversion (DAC) configured to convert I and Q quadrature digital signals, generated from the over-deviated digital baseband signal, into first and second complex analog signals, respectively, the first and second complex analog signals having DAC noise having a power content in non-compliance with a WCDMA communication standard;

means for analog modulating to modulate one pair of the following list of signal pairs: a pair of unmodified first and second complex analog signals and a pair of modified first and second complex analog signals, to output a real analog signal; and means for dividing the phase deviation of one of the following signals by a division factor of M: an unmodified version of the real analog signal and a modified version of the real analog signal, to reduce the DAC noise and thereby output a phase conditioned analog signal, the phase conditioned analog signal having a phase deviation value that is substantially 1/Mth of the phase deviation value of the real analog signal, the power content of the remaining DAC noise after processing being in compliance with the selected communication standard.

23. The system of claim 22, further comprising a means for amplitude limiting the real analog signal to reduce an amplitude modulated noise component of the DAC noise.

24. The system of claim 22, further comprising a means for amplitude limiting the phase conditioned analog signal to reduce an amplitude modulated noise component of the DAC noise.

25. A signal processing system for noise reduction comprising:

means for processing one of the following two signals: the digital baseband input signal and a modification of the digital baseband input signal, with respect to a sampling frequency, $F_S$, and an intermediate frequency, $F_{IF}$, to output an I quadrature signal and a Q quadrature signal being up-shifted from the digital baseband signal, the I and Q quadrature signals including substantially the desired signal content in an up-shifted frequency range substantially centered on the intermediate frequency;

means for digital-to-analog conversion (DAC) to convert the I and Q quadrature signals to first and second complex analog signals, respectively;

means for analog modulating the first and second filtered analog signals according to a modulation frequency, $F_C$, to output a real analog signal having a phase deviation value and including substantially the desired signal content located in a second up-shifted frequency range substantially centered on a frequency having a value substantially equal to the sum of the intermediate frequency, $F_{IF}$, and the modulation frequency, $F_C$, the real analog signal further including an unwanted signal resulting from the modulation; and means for bandpass filtering one of the following two signals: the real analog signal and a modification of the real analog signal, to thereby reduce the unwanted signal, the power content of the remaining unwanted signal after processing being insufficient to violate the noise requirement of the WCDMA communication standard.

26. The system of claim 25 wherein the means for processing the over-deviated digital baseband signal further includes a means for converting the over-deviated digital baseband signal into initial I and Q quadrature signals through trigonometric means to be processed with respect to the sampling frequency, $F_S$, and the intermediate frequency, $F_{IC}$.

27. A method for processing a signal, the method comprising:

digitally multiplying the phase deviation of a digital baseband input signal by a multiplication factor, M, to output an over-deviated digital baseband signal substantially including a desired signal content of the digital baseband input signal;

processing the over-deviated digital baseband signal with respect to a sampling frequency, $F_S$, and an intermediate frequency, $F_{IF}$, to output an I quadrature signal and a Q quadrature signal being up-shifted from the over-deviated digital baseband signal, the I and Q quadrature signals including substantially the desired signal content in an up-shifted frequency range substantially centered on the intermediate frequency;

digital-to-analog converting the I quadrature signal to a first complex analog signal and converting the Q quadrature signal to a second complex analog signal, the first and second complex analog signals including substantially the desired signal content and DAC noise in at least a portion of the frequency spectrum including the up-shifted frequency range of the desired signal content; and dividing the phase deviation of an over-deviation input signal by a division factor of M.

28. The method of claim 27, further comprising analog modulating according to a modulation frequency, $F_C$, to output a real analog signal having a phase deviation value and including substantially the desired signal content located in a second up-shifted frequency range substantially centered on a frequency having a value substantially equal to the sum of the intermediate frequency, $F_{IF}$, and the modulation frequency, $F_C$, the real analog signal further including an unwanted signal resulting from the modulation; and amplitude limiting a limiter input signal and thereby reducing an amplitude modulated noise component of the real analog signal; wherein the limiter input signal is the real analog signal.

29. The method of claim 27, further including bandpassing the over-deviation input signal.

30. The method of claim 27 wherein the digitally multiplying further includes GSM specific phase multiplying having a multiplication factor, K.

31. The method of claim 27 wherein M is so chosen to meet the noise requirements of the GSM communication standard and the first and second DACs are chosen to meet the noise requirements of the WCDMA communication standard.

32. A method for processing a signal, the method comprising:

digitally multiply the digital baseband input signal by a multiplication factor, M, to output an over-deviated digital baseband signal substantially including a desired signal content;

digital-to-analog converting I and Q quadrature digital signals, generated from the over-deviated digital baseband signal, into first and second complex analog signals, respectively, the first and second complex analog signals having DAC noise having a power output content in non-compliance with a WCDMA communication standard;

analog modulating one pair of the following list of signal pairs: a pair of unmodified first and second complex analog signals and a pair of modified first and second complex analog signals, to output a real analog signal; and dividing the phase deviation of one of the following signals by a division factor of M: an unmodified version of the real analog signal and a modified version of the real analog signal, to reduce the DAC noise and thereby output a phase conditioned analog signal, the phase conditioned analog signal having a phase deviation value that is substantially 1/Mth of the phase deviation value of the real analog signal, the power content of the remaining DAC noise in compliance with the WCDMA communication standard.

33. The method of claim 32, further comprising amplitude limiting the real analog signal to reduce an amplitude modulated noise component of the DAC noise.

34. The method of claim 32, further comprising amplitude limiting the phase conditioned analog signal to reduce an amplitude modulated noise component of the DAC noise.

35. A method for signal processing, the method comprising:

processing one of the following two signals: the digital baseband input signal and a modification of the digital baseband input signal, with respect to a sampling frequency, $F_S$, and an intermediate frequency, $F_{IF}$, to output an I quadrature signal and a Q quadrature signal being up-shifted from the digital baseband signal, the I and Q quadrature signals including substantially the desired signal content in an up-shifted frequency range substantially centered on the intermediate frequency;

digital-to-analog converting (DAC) the I and Q quadrature signals to first and second complex analog signals, respectively;

analog modulating the first and filtered analog signals according to a modulation frequency, $F_C$, to output a real analog signal having a phase deviation value and including substantially the desired signal content located in a second up-shifted frequency range substantially centered on a frequency having a value substantially equal to the sum of the intermediate frequency, $F_{IF}$, and the modulation frequency, $F_C$, the real analog signal further including an unwanted signal resulting from the modulation; and bandpass filtering one of the following two signals: the real analog signal and a modification of the real analog signal, to reduce power in the unwanted signal to comply with a WCDMA communication standard.

36. The method of claim 35 wherein processing the over-deviated digital baseband signal further includes converting the over-deviated digital baseband signal into initial I and Q quadrature signals trigonometrically to be processed with respect to the sampling frequency, $F_S$, and the intermediate frequency, $F_{IC}$.

* * * * *